United States Patent
Jones et al.

(10) Patent No.: US 12,504,587 B2
(45) Date of Patent: Dec. 23, 2025

(54) SEALABLE FIBER OPTIC CABLE CONNECTION SYSTEM

(71) Applicant: Baker Hughes Holdings LLC, Huston, TX (US)

(72) Inventors: Keith Jones, Houston, TX (US); Robin Desai, Houston, TX (US); Kevin McKinny, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 506 days.

(21) Appl. No.: 17/971,990

(22) Filed: Oct. 24, 2022

(65) Prior Publication Data

US 2024/0134132 A1 Apr. 25, 2024
US 2024/0231014 A9 Jul. 11, 2024

(51) Int. Cl.
*G02B 6/38* (2006.01)

(52) U.S. Cl.
CPC .................. *G02B 6/3897* (2013.01)

(58) Field of Classification Search
CPC ........................................ G02B 6/38
USPC ........................................... 385/78
See application file for complete search history.

(56) References Cited

U.S. PATENT DOCUMENTS

| | | | |
|---|---|---|---|
| 6,101,406 A * | 8/2000 | Hacker | A61M 1/3621 422/68.1 |
| 8,342,756 B2 | 1/2013 | Moidu et al. | |
| 11,391,893 B2 * | 7/2022 | Takeuchi | G02B 6/385 |
| 2004/0202401 A1 * | 10/2004 | Berg | G01V 11/00 385/12 |
| 2011/0263953 A1 * | 10/2011 | Markle | A61B 5/14532 600/310 |
| 2012/0056363 A1 * | 3/2012 | Ritter | G01V 1/18 267/158 |

FOREIGN PATENT DOCUMENTS

| | | | |
|---|---|---|---|
| ES | 2981924 T3 * | 10/2024 | G02B 6/423 |
| FR | 2855882 A1 * | 12/2004 | G02B 6/3833 |
| WO | WO-2011137178 A1 * | 11/2011 | A61B 5/14532 |

OTHER PUBLICATIONS

Barker P.A., "Stress Corrosion Cracking in Twin Ferrule Compression Fittings in SS31600", SPE International Oilfield Corrosion Conference and Exhibition, Jun. 18, 2018, 2 pgs.

* cited by examiner

*Primary Examiner* — Kaveh C Kianni
(74) *Attorney, Agent, or Firm* — Mintz, Levin, Cohn, Ferris, Glovsky and Popeo, P.C.

(57) ABSTRACT

A sealable connection system is provided. The system can include a connection assembly including a housing and at least one ferrule positioned within the housing. An inner surface of the housing can be arranged to mate with and secure to an outer surface of a sensor assembly. The at least one ferrule can be arranged to engage with the sensor assembly as the housing is secured to the sensor assembly. The system can also include a fiber optic cable assembly. The fiber optic cable assembly can include a fiber optic cable extending through the housing and the at least one ferrule. The fiber optic cable can also be surrounded, at least along a length of the fiber optic cable within the connection assembly, by a fiber optic cable cover. The sealable connection system is provided to hermetically connect the fiber optic cable assembly to a sensor assembly.

12 Claims, 9 Drawing Sheets

SEALABLE FIBER OPTIC CABLE CONNECTION SYSTEM

BACKGROUND

This invention pertains to connections between sensors and fiber optic cables, particularly hermetic connections in high temperature high pressure applications in the field of oil and gas.

SUMMARY

In one aspect, a system is provided. In one embodiment, the system can include a connection assembly including a housing including a first end having a first opening connected to a first inner surface parallel to the first end. The housing can also include a second end having a second opening, the second opening forming a second inner surface. The second inner surface can be arranged to run normal to the first inner surface. The second inner surface can also be arranged to mate with and secure to an outer surface of a sensor assembly. The connection assembly can also include at least one ferrule positioned within the housing adjacent to the first opening. The at least one ferrule can be arranged to engage with the sensor assembly as the housing is secured to the sensor assembly. The system can also include a fiber optic cable assembly including a fiber optic cable. The fiber optic cable can be arranged to extend through the first opening of the housing, the at least one ferrule, and the second opening of the housing. The fiber optic cable assembly can also include a cover surrounding the fiber optic cable. The cover can be arranged to cover the fiber optic cable at least along a length of the fiber optic cable within the connection assembly. The connection assembly can be arranged to hermetically connect the fiber optic cable assembly to the sensor assembly.

In some embodiments, the at least one ferrule can include a first ferrule and a second ferrule. In this embodiment, the first ferrule can be positioned within the housing adjacent to the first opening. The first ferrule can include a first sloped portion and a protruding portion adjacent to the first sloped portion. The second ferrule can be positioned between the first ferrule and the second opening. The second ferrule can include a second sloped portion and a wedge-shaped portion. The first sloped portion of the first ferrule can be arranged to engage with the second sloped portion of the second ferrule. The wedge-shaped portion of the second ferrule can be arranged to engage with the sensor assembly as the housing is secured to the sensor assembly.

In some embodiments, the first sloped portion of the first ferrule and/or wedge-shaped portion of the second ferrule can be arranged to penetrate the cover as the housing is secured to the sensor assembly. In some embodiments, the housing, the first ferrule, and/or the second ferrule can be made from stainless steel. In some embodiments, the connection assembly and the fiber optic cable assembly can be made for use in a sensing environment having an operating temperature between −55 degrees and 325 degrees Celsius.

In some embodiments, the first ferrule, the second ferrule, and the fiber optic cable assembly can be arranged with respect to one another along a longitudinal axis extending through the first ferrule, the second ferrule, the fiber optic cable assembly, and the sensor assembly. In some embodiments, the connection assembly can be arranged to releasably engage from the sensor assembly to allow for repeatable sealing and unsealing. In some embodiments, the second inner surface can be threaded. In some embodiments, the sensor assembly can include a flame sensor.

In some embodiments, the at least one ferrule can be chosen from a set of a self-swaging nut, an integrated taper adapter, an insulated ferrule, an uninsulated ferrule, a twin ferrule, and an olive ferrule. In some embodiments, the cover can further include at least one notch arranged to receive the at least one ferrule as the housing is secured to the sensor assembly.

In another aspect, a method is provided. In one embodiment, the method can include placing at least one ferrule within a housing. The housing can include a first end having a first opening connected to a first inner surface parallel to the first end. The housing can also include a second end having a second opening. The second opening can form a second inner surface. The second inner surface can be arranged to run normal to the first inner surface. The at least one ferrule can be placed adjacent to the first inner surface. The method can also include inserting a fiber optic cable assembly through the first opening of the housing, the at least one ferrule, and the second opening of the housing. The fiber optic cable assembly can include a fiber optic cable and a cover. The cover can be configured to surround the fiber optic cable at least along a length of the fiber optic cable within the housing. The method can also include mating the second inner surface of the housing with an outer surface of the sensor assembly. The method can also include securing the second inner surface of the housing with an outer surface of the sensor assembly. Securing can further include translating the housing in a direction toward the sensor assembly. Securing can also include engaging the at least one ferrule with a portion of the sensor assembly within the housing. Securing can also include providing a hermetic connection between the fiber optic cable assembly and the sensor assembly.

In some embodiments, the at least one ferrule can include a first ferrule and a second ferrule. The first ferrule can include a first sloped portion and a protruding portion adjacent to the first sloped portion. The second ferrule including a second sloped portion and a wedge-shaped portion opposite the second sloped portion. In this embodiment, the method can also include placing the first ferrule adjacent to the first inner surface. The method can also include placing the second ferrule between the first ferrule and the second opening, such that the second sloped portion of the second ferrule faces the first sloped portion of the first ferrule. The method can also include engaging the first sloped portion of the first ferrule with the second sloped portion of the second ferrule and engaging the wedge-shaped portion of the second ferrule with the sensor assembly.

In some embodiments, the method can also include penetrating of the wedge-shaped portion of the second ferrule and/or the first sloped portion of the first ferrule into the cover of the fiber optic cable. In some embodiments, the housing, the first ferrule, the second ferrule, and/or the cover can be made from stainless steel. In some embodiments, the housing, the first ferrule, the second ferrule, and the cover can be made for use in a sensing environment having an operating temperature between −55 and 325 degrees Celsius. In some embodiments the sensor assembly can be a flame sensor.

In some embodiments, the method can also include coupling the sensor assembly to a combustion chamber of a turbine. In some embodiments, the second inner surface can be threaded. In some embodiments, the method can also include receiving the at least one ferrule into at least one notch in the cover, as the housing is secured to the sensor assembly.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Traditionally, flame sensors in industrial applications employ welding techniques to achieve a hermetic connection between a fiber optic cable and a sensor assembly containing the fiber optic cable. Welding provides a strong hermetic connection in environments with high vibration, pressure, and temperature. While welding provides a hermetic seal, it can reduce or eliminate serviceability. Commercially available connectors do not provide hermetic sealing and have limitations in temperature survivability.

The system described herein addresses the aforementioned shortcomings. For example, one or more embodiments of the system herein can include a connection assembly including a self-swaging compression tube fitting configured to allow for repeatable hermetic sealing and unsealing of a fiber optic cable to a sensor enclosure. The system can withstand high temperature and high pressure operating environments. The fitting geometry can enable repeatable axial and concentric positioning of the fiber optic cable relative to a sensor assembly.

The system described herein provides a reliable metal-to-metal hermetic seal of a fiber optic cable to a sensor enclosure. The system can provide a releasable connection between the flame sensor and the connection assembly that is repeatably serviceable, unlike traditional welded attachments. The ability to repeatedly seal and unseal, a hermetic connection, can provide the advantageous ability to repeatedly locate a fiber optic cable end, relative to other optical components contained within a sensor body to ensure maximum light capture and transmission. A secondary advantage being that the system describe herein allows for the ability to adjust the distance of an end of the fiber optic cable as well as a focusing lens located between the end of the fiber optic cable and a light source in order to maximize the amount of light impinging the fiber optic cable end. Additionally, the connection assembly can be formed from materials such as stainless steel to allow the system to operate in sensing environments of up to 325 degrees Celsius.

Figure 1:
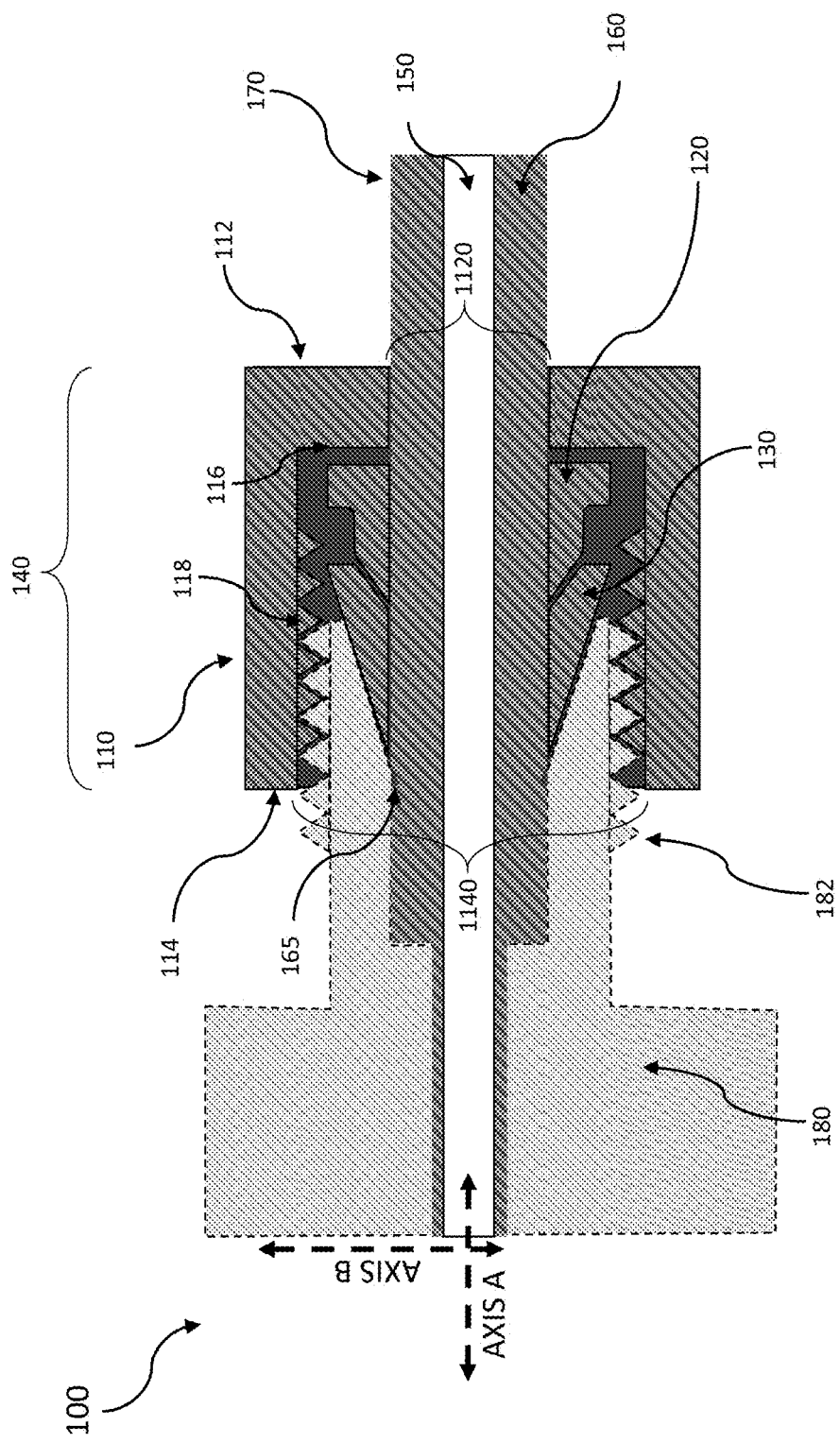
FIG. 1 is a cross-sectional side view of one dual ferrule embodiment of a connection system for hermetically sealing a fiber optic cable assembly to a sensor assembly.

FIG. 1 is a cross-sectional view of one embodiment of a connection system 100 for hermetically sealing a fiber optic cable to a sensor. As shown in FIG. 1, the system 100 can include a connection assembly 140 including a housing 110, a first ferrule 120 and a second ferrule 130. The housing 110 has a generally hollow elongate cylindrical configuration with a first end 112 with a first opening 1120, a second end 114 with a second opening 1140, a first inner surface 116 which runs parallel to an Axis B, and a second inner surface 118 which can be threaded and runs parallel to an Axis A. A first ferrule 120 may be positioned within the housing 110, adjacent to the first opening 1120 of the first end 112. A second ferrule 130 may be positioned in between the first ferrule 120 and the second opening 1140 of the second end 114. A fiber optic cable assembly 170 can include a fiber optic cable 150 extending through the first opening 1120 of the first end 112 of the housing 110, the first ferrule 120, the second ferrule 130, and the second opening of the second end 114 of the housing 110 as shown in FIG. 1. The fiber optic cable assembly 170 can further include a cover 160 surrounding the fiber optic cable 150 along at least a portion of the length of the fiber optic cable 150 within the housing 140 of the fiber optic cable 150. In some embodiments, the cover 160 can be manufactured with an at least one notch 165 configured to receive the second ferrule 130 and/or the first ferrule 120 during a sealing operation (discussed below in relation to FIG. 4).

As shown in FIG. 1, the system 100 is illustrated in an initial assembly state before the connection assembly 140 is hermetically secured to a sensor assembly 180. In this embodiment, the second inner surface 118 of the housing 110 can be configured to couple with an outer surface 182 of the sensor assembly 180 as shown in FIG. 1. In some embodiments, the second inner surface 118 of the housing 110 and the outer surface 182 of the sensor assembly 180 can be threaded. The sensor assembly 180 may include, for example, a flame sensor. In some embodiments, the sensor assembly 180 can be coupled, for example, to a combustion chamber of a turbine. In some embodiments, the connection assembly 140 and its components (e.g., the housing 110, the first ferrule 120, and the second ferrule 130) may be made from stainless steel. The cover 160 may also be made from stainless steel. Additionally, the connection assembly 140 and the fiber optic cable assembly 170 can be designed to operate in a sensing environment of −55 degrees Celsius to 325 degrees Celsius. In other embodiments, the connection assembly 140 and the cover 160 can be made from aluminum and/or copper.

Figure 2:
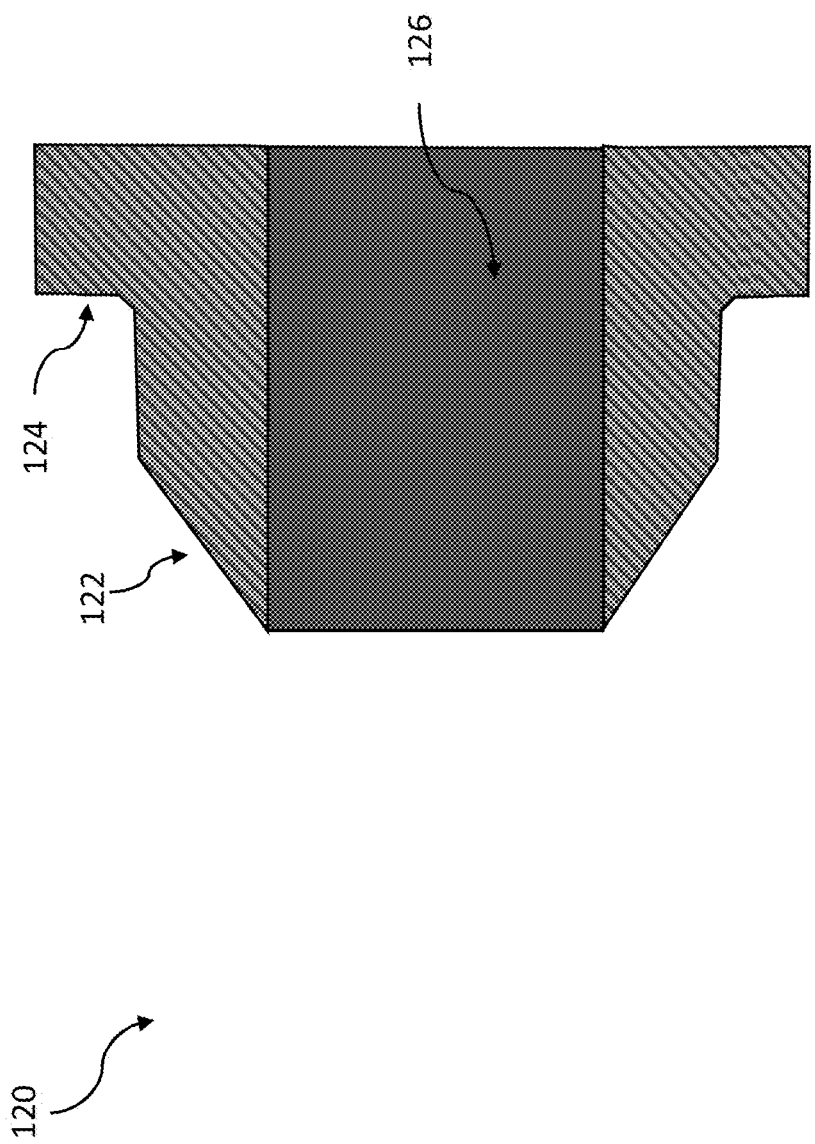
FIG. 2 is a cross-sectional view of the first ferrule of FIG. 1.

FIG. 2 is a cross-sectional view of the first ferrule 120 described in relation to FIG. 1. As shown in this embodiment, the first ferrule 120 can include a first sloped portion 122 and a protruding portion 124 adjacent to the first sloped portion 122. The first ferrule 120 can further include a lumen 126 that can be configured to surround the fiber optic cable assembly 170. In this way, the lumen 126 contains the fiber optic cable 150 and the cover 160.

Figure 3:
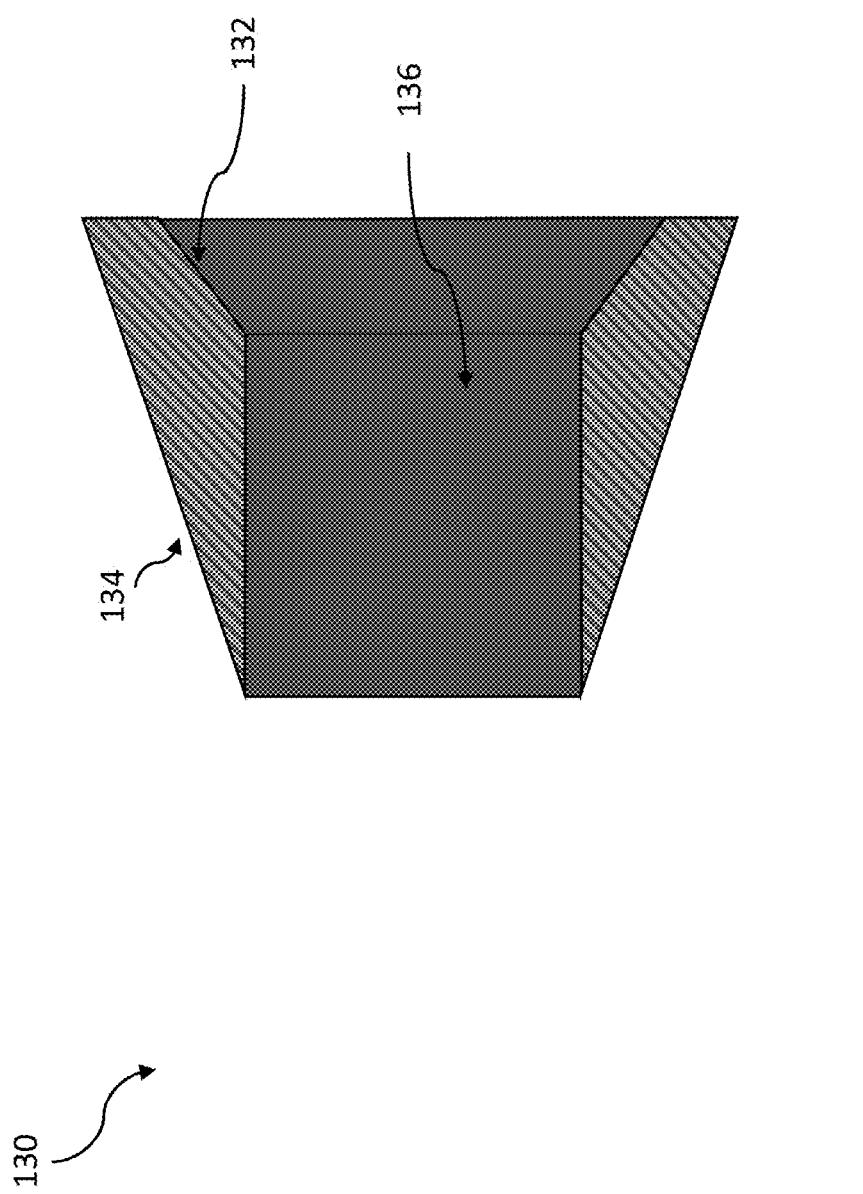
FIG. 3 is a cross-sectional view of the second ferrule of FIG. 1.

FIG. 3 is a cross-sectional view of the second ferrule 130 described in relation to FIG. 1. As shown in this embodiment, the second ferrule 130 can include a second sloped portion 132 that can be configured to sealably engage with the first sloped portion 122 of the first ferrule 120 as the housing 110 is secured to the sensor assembly 180. The second ferrule 130 can further include a wedge-shaped portion 134. The second ferrule 130 can further include a lumen 136 that is configured to surround the fiber optic cable assembly 170. Thus, the lumen 136 contains the fiber optic cable 150 and the cover 160.

Figure 4:
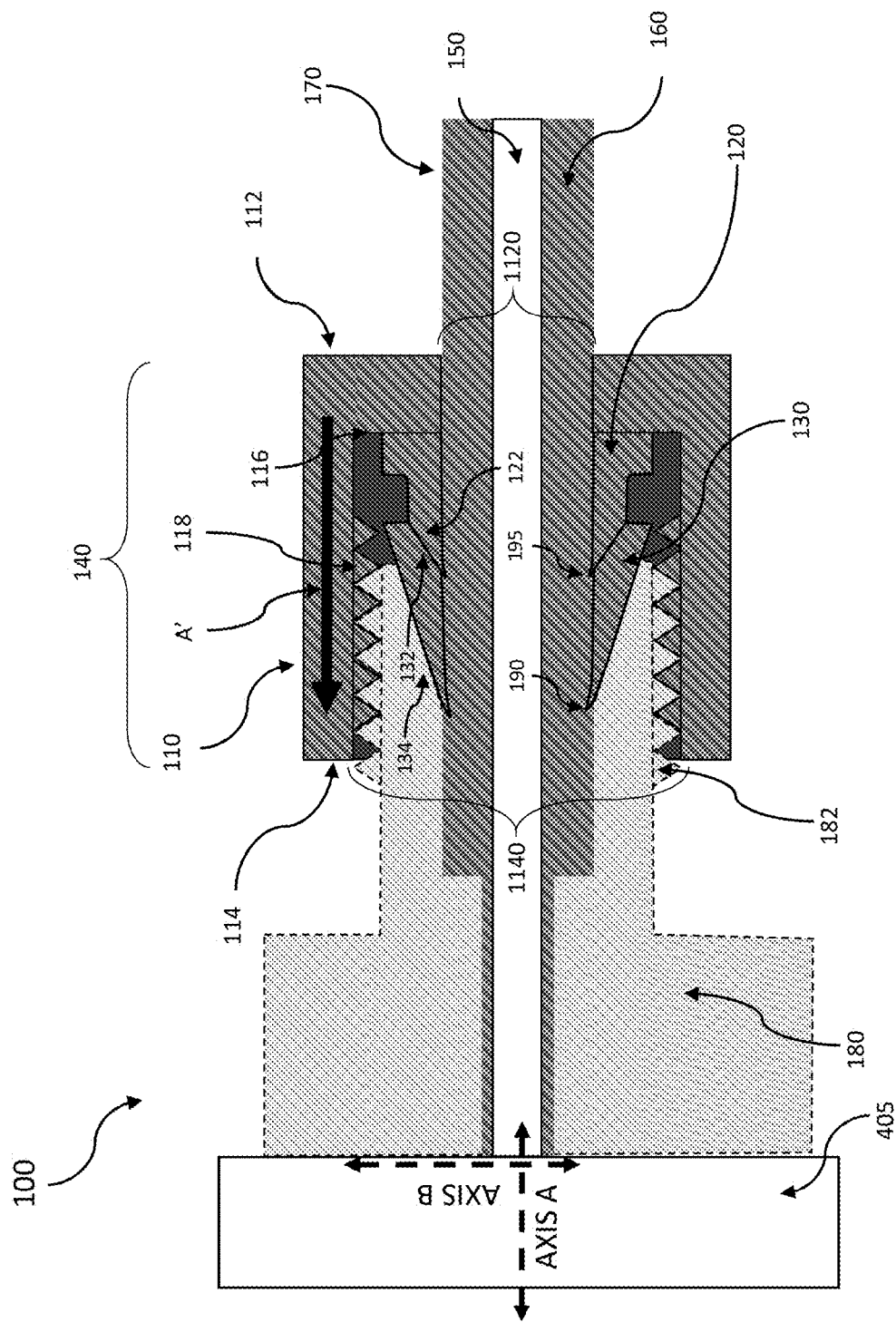
FIG. 4 is a cross-sectional side view of the embodiment of FIG. 1 after securing and hermetically sealing a fiber optic cable assembly to a sensor assembly according to subject matter described herein.

FIG. 4 illustrates connection system 100 in a secured state. In the secured state, the connection assembly 140 fixedly positions and hermetically seals the fiber optic cable assembly 170 to the sensor assembly 180. The sensor assembly 180 can be coupled to an industrial equipment 405, such as a combustion chamber of a turbine. In other embodiments, the industrial equipment 405 can be any one of a mechanical inspection device, a medical device, a communication device, a lighting device, and/or a broadcasting device.

In some embodiments, securing the connection assembly 140 to the sensor assembly 180 may be accomplished by mating the second inner surface 118 of the housing 110 with the outer surface 182 of the sensor assembly 180. In some embodiments, the second inner surface 118 of the housing 110 and the outer surface 182 of the sensor assembly 180 can be threaded. The housing 110 can be tightened to secure the connection assembly 140 onto the sensor assembly 180. During the process of tightening, the housing 110 may be configured to move in a direction A', toward the sensor assembly 180, as shown. As the housing 110 is moved in the direction A', The first ferrule 120 can abut the first inner surface 116 of the housing 110 at the first opening 1120 to cause the first sloped portion 122 of the first ferrule 120 to engage with the second sloped portion 132 of the second ferrule 130 as the housing 110 is secured to the sensor assembly 180. Further, the wedge-shaped portion 134 of the second ferrule 130 can be configured to engage with the sensor assembly 180. As the housing 110 is secured to the sensor assembly 180, the engagement between the first ferrule 120 and the second ferrule 130 can cause the second sloped portion 132 to sealably engage with the first sloped portion 122. Engagement of the first sloped portion 122 of the first ferrule 120 with the second sloped portion 132 of the second ferrule 130, and the wedge-shaped portion 134 of the second ferrule 130 with the sensor assembly 180, can cause the wedge-shaped portion 134 and/or the first sloped portion 122 of the to penetrate into the cover 160 at points 190 and 195 respectively. In embodiments that include the at least one notch 165 the at least one notch 165 can be configured to align with the point 190 and/or 195. This penetration can form a hermetic seal between the fiber optic cable assembly 170 and the sensor assembly 180 which can be desirable for accurate sensing using fiber optics.

In some embodiments, where the second inner surface 118 of the housing 110 and the outer surface 182 of the sensor assembly 180 are threaded, during the process of securing the housing 110 to the sensor assembly 180, once the first ferrule 120 becomes sealably engaged with the second ferrule 130, a hermetic connection can be achieved by performing a limited number of full rotations of the housing 110 around the threaded outer surface 182 of the sensor assembly 180. For example, the system 100 can be configured such that only 1-3 rotations of the housing 110 are required before the connection assembly 140 and the sensor assembly 180 are hermetically sealed. Ideally, a hermetic connection can be formed by less than 2 full rotations (e.g., 1.5 rotations) of the housing 110 around the threaded outer surface 182 of the sensor assembly 180.

In some embodiments, it may be desirable to easily connect and disconnect the connection assembly 140 relative to the sensor assembly 180 to provide serviceability, or perform maintenance operations. As such, the connection assembly 140 described herein can be configured to connect and disconnect from the sensor assembly 180 to allow for repeatable hermetic sealing and unsealing. In some embodiments, after releasing housing 110 from the sensor assembly 180, repeating the sealing process may be executed using all of the original components of the system. As a result, repair costs and the need for excess inventory of additional connection assemblies can be reduced.

In some embodiments, after disconnecting the housing 110 from the sensor assembly 180, the wedge-shaped portion 134 and/or the first sloped portion 122 may have penetrated into the cover 160 at points 190 and 195 respectively. As a result the first ferrule 120, the second ferrule 130 and the fiber optic cable assembly 170 can be coupled to one another along a longitudinal axis. Advantageously, this can allow a coupled connection assembly 140 and fiber optic cable assembly 170 to be applied or secured to another sensor assembly 180 without having to reassemble the connection assembly 140 and the fiber optic cable assembly 170 or use a new connection assembly 140 and/or fiber optic cable assembly 170. Alternately, this coupling can allow for replacement of the fiber optic cable assembly 170 (along with the first ferrule 120 and the second ferrule 130) without removal of the sensor assembly 180 from its sensing environment.

Figure 5:
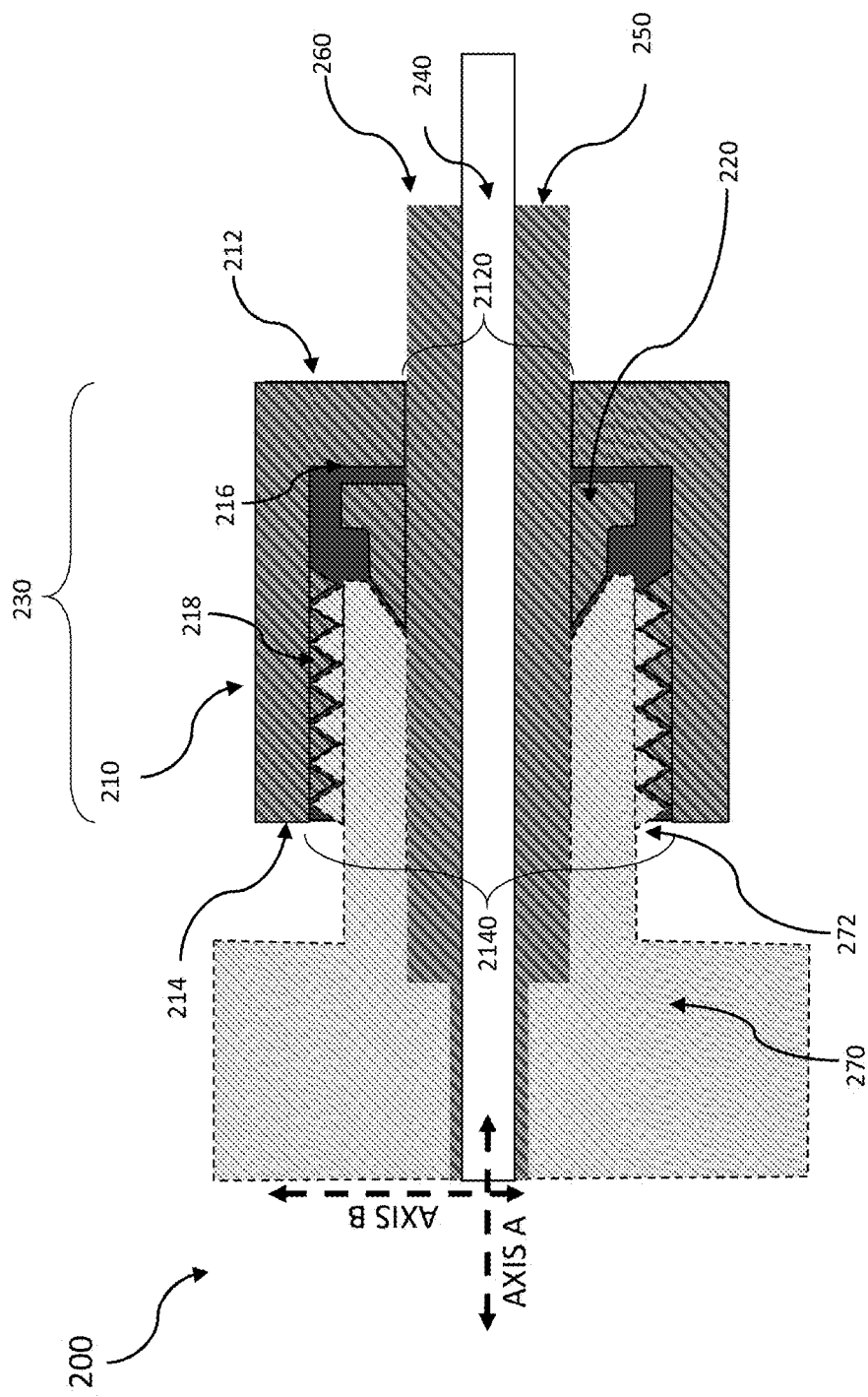
FIG. 5 is a cross-sectional side view of one single ferrule embodiment of a connection system for hermetically sealing a fiber optic cable assembly to a sensor assembly.

FIG. 5 is a cross-sectional view of one embodiment of a connection system 200 for hermetically sealing a fiber optic cable to a sensor. As shown in FIG. 5, the system 200 can include a connection assembly 230 including a housing 210, a ferrule 220. The housing 210 has a generally hollow elongate cylindrical configuration with a first end 212 with a first opening 2120, a second end 214 with a second opening 2140, a first inner surface 216, which runs parallel to an Axis B, and a second inner surface 218 which and runs parallel to an Axis A. In some embodiments, the second inner surface 218 can be threaded. In some embodiments, the ferrule 220 can be of the same form as the first ferrule 120 of FIG. 2 or the second ferrule 130 of FIG. 3. Alternatively, the ferrule 220 can be a self-swaging nut, an integrated taper adapter, an insulated ferrule, an uninsulated ferrule, an olive ferrule, or the like. In some embodiments, the ferrule 220 can be made from stainless steel, aluminum, or copper. The ferrule 220 can be positioned within the housing 210, adjacent to the first opening 2120 of the first end 212. A fiber optic cable assembly 260 can include a fiber optic cable 240 extending through the first opening 2120 of the first end 212 of the housing 210, the first ferrule 220, the second ferrule 230, and the second opening 2140 of the second end 214 of the housing 210 as shown in FIG. 5. The fiber optic cable assembly 260 can further include a cover 250 surrounding the fiber optic cable 240 along at least a portion of the length of the fiber optic cable 240 within the housing 230.

As shown in FIG. 5, the system 200 is illustrated in an initial assembly state before the connection assembly 230 is hermetically secured to a sensor assembly 270. In this embodiment, the threaded inner surface 216 of the housing 210 can be configured to couple with a threaded outer surface 272 of the sensor assembly 270 as shown in FIG. 5. The sensor assembly 270 may include, for example, a flame sensor or a photo sensor. In some embodiments, the sensor assembly 270 can be coupled, for example, to a combustion chamber of a turbine. In some embodiments, the connection assembly 230 and its components (e.g., the housing 210, the first ferrule 220, and the second ferrule 230) may be made from stainless steel. The cover 250 may also be made from stainless steel. Additionally, the connection assembly 230 and the fiber optic cable assembly 260 can be designed to operate in a sensing environment of −55 degrees Celsius to 325 degrees Celsius. In other embodiments, the connection assembly 230 and the cover 250 can be made from aluminum and/or copper.

Figure 6:
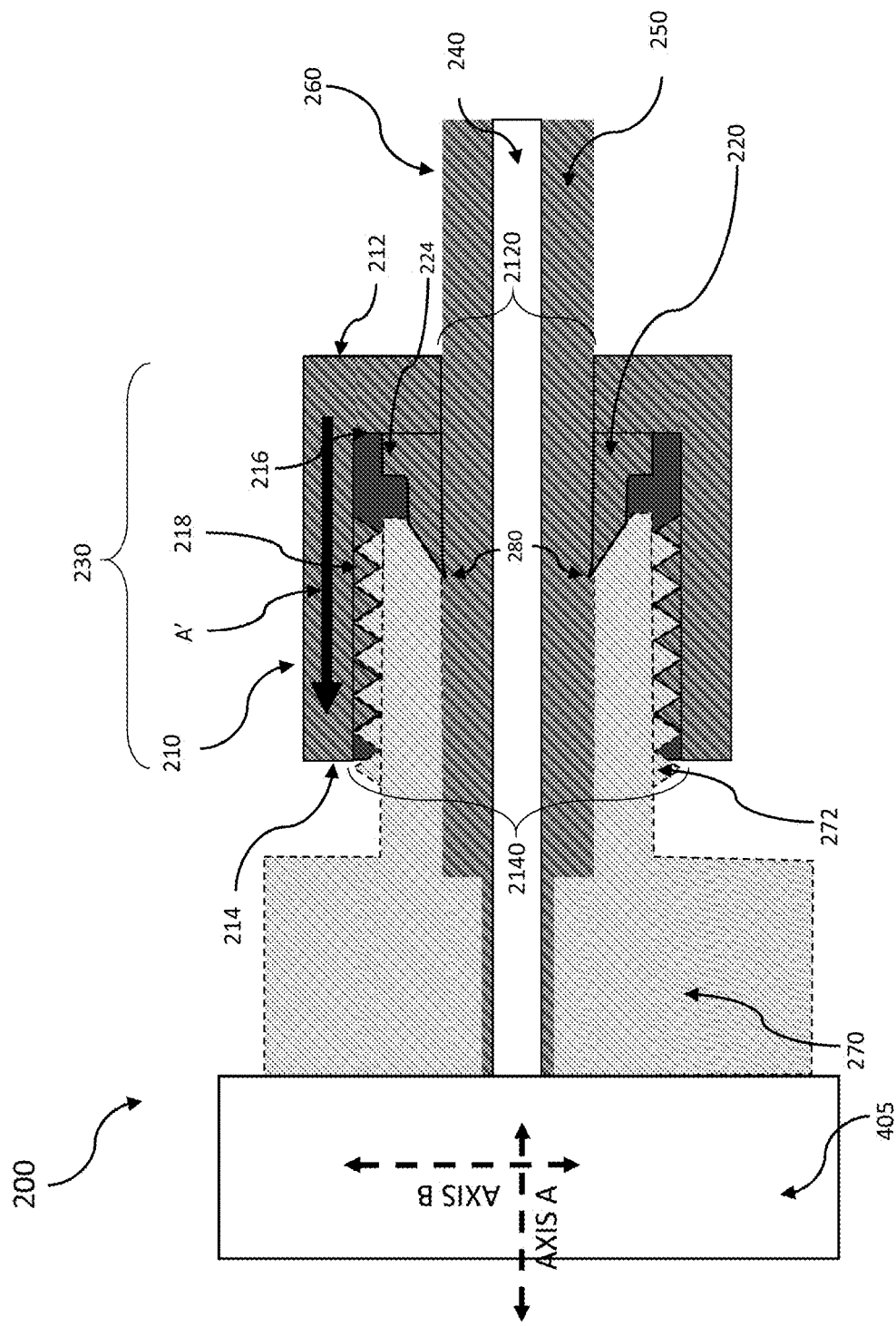
FIG. 6 is a cross-sectional side view of the embodiment of FIG. 5 after securing and hermetically sealing a fiber optic cable assembly to a sensor assembly according to subject matter described herein.

FIG. 6 illustrates connection system 200 in a secured state. In the secured state, the connection assembly 230 fixedly positions and hermetically seals the fiber optic cable assembly 260 to the sensor assembly 270. The sensor assembly 270 can further be coupled to an industrial equipment 405, such as a combustion chamber of a turbine. In other embodiments, the industrial equipment 405 can be any one of a mechanical inspection device, a medical device, a communication device, a lighting device, and/or a broadcasting device.

In some embodiments, securing the connection assembly 230 to the sensor assembly 270 may be accomplished by mating the second inner surface 218 of the housing 210 with the outer surface 272 of the sensor assembly 270. In some embodiments, the second inner surface 218 and the outer surface of 272 can be threaded. The housing 210 can be tightened to secure the connection assembly 230 onto the sensor assembly 270. During the process of tightening, the housing 210 may be configured to move in a direction A', toward the sensor assembly 270, as shown. As the housing 210 is moved in the direction A', the first ferrule 220 can be configured abut the first inner surface 216 of the housing 210 at the first opening 2120 to cause ferrule 220 to translate in the direction A' and to engage with the sensor assembly 270 as the housing 210 is secured to the sensor assembly 270. As the housing 210 is secured to the sensor assembly 270, the engagement between the ferrule 220 and the sensor assembly 270 can cause the ferrule to penetrate into the cover 250 at point 280. This penetration can form a hermetic seal between the fiber optic cable assembly 260 and the sensor assembly 270 which can be desirable for accurate sensing using fiber optics.

In some embodiments, where the second inner surface 218 and the outer surface of 272 are threaded, during the process of securing the housing 210 to the sensor assembly 270, once the ferrule 220 becomes sealably engaged with the sensor assembly 270, a hermetic connection can be achieved by performing a limited number of full rotations of the housing 210 around the threaded outer surface 272 of the sensor assembly 270. For example, the system 200 can be configured such that only 1-3 rotations of the housing 210 are required before the connection assembly 230 and the sensor assembly 270 are hermetically sealed. Ideally, a hermetic connection can be formed by less than 2 full rotations (e.g., 1.5 rotations) of the housing 210 around the threaded outer surface 272 of the sensor assembly 270.

In some embodiments, it may be desirable to easily connect and disconnect the connection assembly 230 relative to the sensor assembly 270 to provide serviceability, or perform maintenance operations. As such, the connection assembly 230 described herein can be configured to connect and disconnect from the sensor assembly 270 to allow for repeatable hermetic sealing and unsealing. In some embodiments, after releasing housing 210 from the sensor assembly 270, repeating the sealing process may be executed using all of the original components of the system. As a result, repair costs and the need for excess inventory of additional connection assemblies can be reduced.

In some embodiments, after disconnecting the housing 210 from the sensor assembly 270, the ferrule 220 and the fiber optic cable assembly 260 may be coupled to one another along a longitudinal axis. Advantageously, this can allow a coupled connection assembly 230 and fiber optic cable assembly 260 to be applied or secured to another sensor assembly 270 without having to reassemble the connection assembly 230 and the fiber optic cable assembly 260 or use a new connection assembly 230 and/or fiber optic cable assembly 260. Alternately, this coupling can allow for replacement of the fiber optic cable assembly 260 (along with the ferrule 220) without removal of the sensor assembly 270 from its sensing environment.

Figure 7:
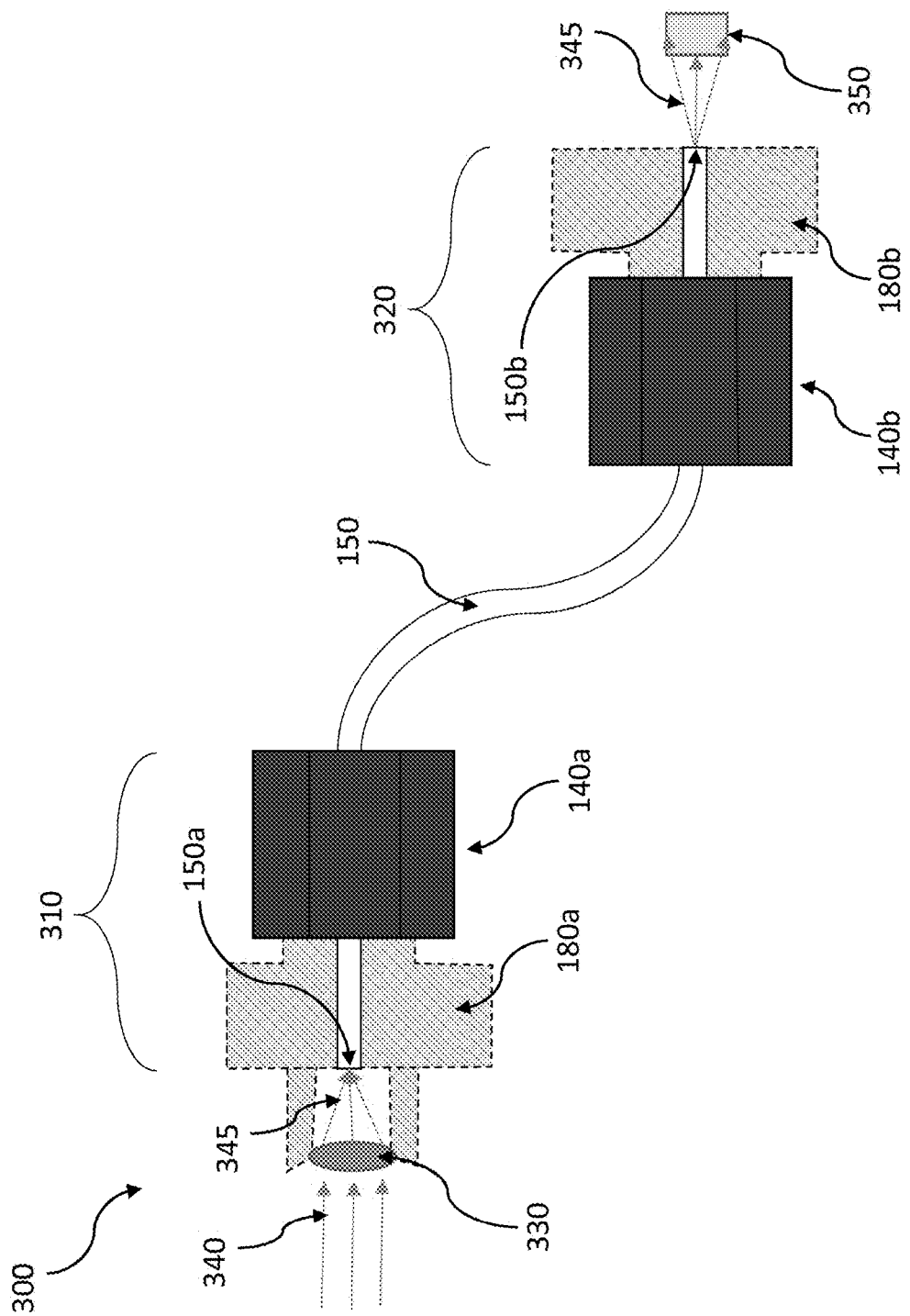
FIG. 7 illustrates one embodiment of system for transmitting light from an operating environment to a sensing environment using the connection system of FIG. 1

FIG. 7 illustrates an example system 300 for transmitting light from an operating environment to a sensing environment. System 300 can include a receiving end 310 which can also be referred to as a hot-end 310. The hot-end 310 can further include a first connection assembly 140a configured to hermetically couple a first end 150a of a fiber optic cable 150 to a first sensor assembly 180a. The first connection assembly 140a, the fiber optic cable 150 and the first sensor assembly 180a are described in relation to connection assembly 140, the fiber optic cable 150 and the first sensor assembly 180 of FIG. 1 respectively. System 300 can also include a transmitting end 320 which can also be referred to as a cold-end 320. The cold-end 320 can further include a second connection assembly 140b configured to hermetically couple a second end 150b of the fiber optic cable 150 to a second sensor assembly 180b. The second connection assembly 140b, the fiber optic cable 150 and the second sensor assembly 180b are described in relation to connection assembly 140, the fiber optic cable 150 and the first sensor assembly 180 of FIG. 1 respectively. The hot-end 310 can be configured to connect to a view port 330 of a gas turbine combustor. The viewport 330 can further include transparent pressure barrier and a lens that can be configured to receive light 340 from the gas turbine combustor and transmit focused light 345 into the first end of the fiber optic cable 150a. The cold-end 320 can be configured to connect to a photo sensor 350 which can further be communicatively coupled to a processor or various computing device. The photo sensor 350 can be configured to receive the focused light 345 from the second end of the fiber optic cable 150b. The photo sensor 350 may further be coupled to a lens to further focus the focused light 345 onto the photo sensor 350. The system 300 described herein allows for resealable hermetic fiber optic connections in high temperature environments. The system 300 further allows for the transmission of light 340 from a high temperature environment (i.e. a gas turbine combustor, operating at up to 325 C) to a lower temperature environment (i.e. a computing system, operating at less than 110 C). Such a capability allows for the operation and use of electronics to process the light 340. Additionally, system 300 allows for replacement of a hot-end 310 or a replacements of the electronics provided in connection to the cold-end 320 in the field without the need to replace the fiber optic cable 150.

Figure 8:
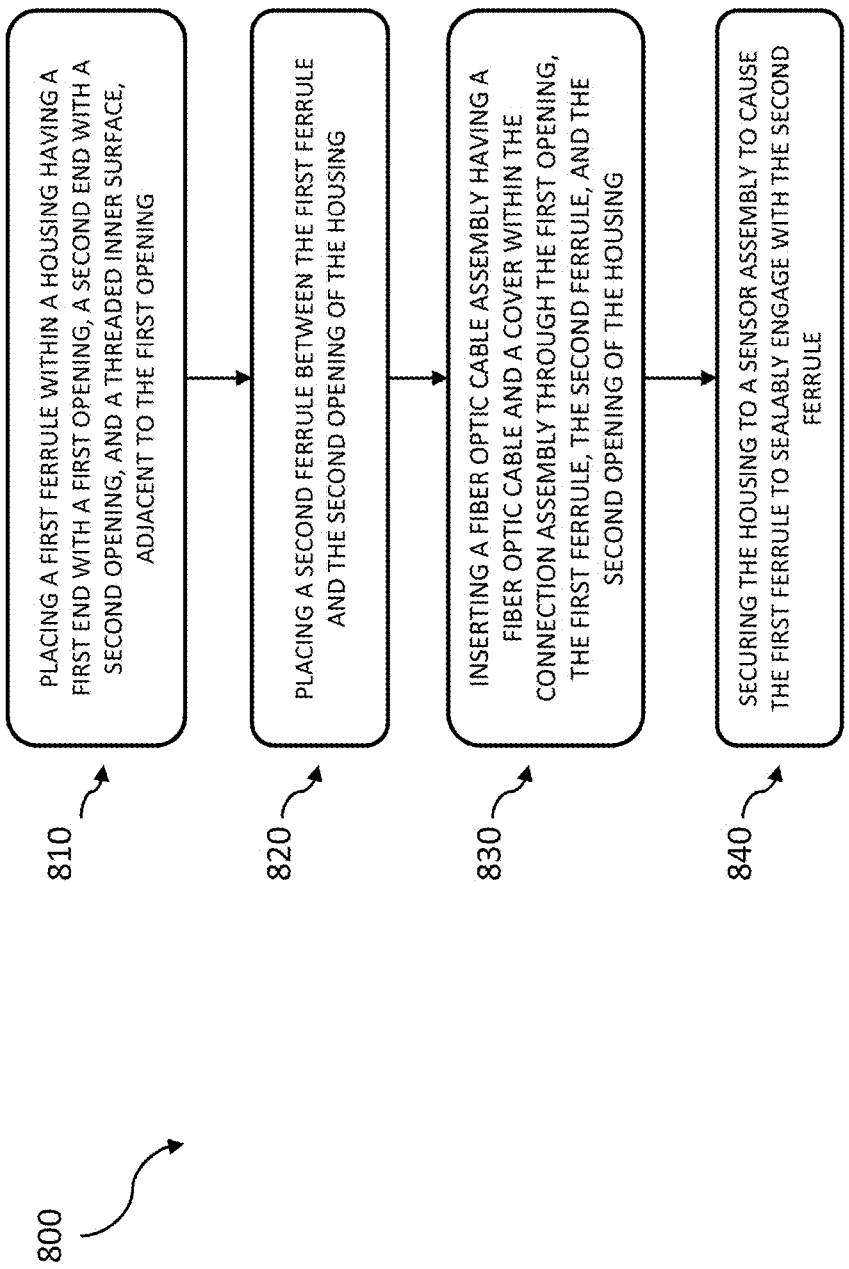
FIG. 8 illustrates an example method of securing a fiber optic cable assembly to a sensor assembly using the connection system of FIG. 1.

FIG. 8 is a process diagram illustrating an example process 800 of assembling and securing a connection assembly to a sensor assembly as described herein in relation to FIG. 1. At 810, a connection assembly 140 can be assembled. Assembling the connection assembly 140 can include placing a first ferrule 120 within a housing 110 adjacent to the first opening 1120.

At 820, the process 800 can include placing a second ferrule 130 between the first ferrule 120 and the second opening 1140 of the housing 110. At 830, the process 800 can include inserting a fiber optic cable assembly 170 within the connection assembly 140. The fiber optic cable assembly 170 can be inserted through the second opening 1140, the first ferrule 120, and the second ferrule 130.

At 840, the process 800 can include securing the housing 110 to a sensor assembly 180. The securing can cause the first ferrule 120 to sealably engage with the second ferrule 130. Step 840 may further include the wedge-shaped portion 134 of the second ferrule 130 to penetrating the cover 160 of the fiber optic cable 150. The securing can further include engaging a sloped portion 132 of the second ferrule 130 with a sloped portion 122 of the first ferrule 120. Securing the housing 110 to the sensor assembly 180 can form a hermetic seal between the fiber optic cable assembly 140 and the sensor assembly 180.

In some embodiments, the method 800 can also include a step of coupling the sensor assembly 180 to a piece of industrial equipment 405 to acquire data of an operation of the industrial equipment. In some embodiments, the industrial equipment can include a combustion chamber of a turbine, mechanical inspection devices, medical devices, communication devices, lighting devices, and/or broadcasting devices. In some embodiments, the securing can also include mating a second inner surface 118 of the housing 110 with an outer surface 182 of the sensor assembly 180. Although, coupling of the housing 110 and the sensor assembly 180 is shown using a threaded coupling, non-threaded coupling mechanisms can also be envisioned without limit.

Figure 9:
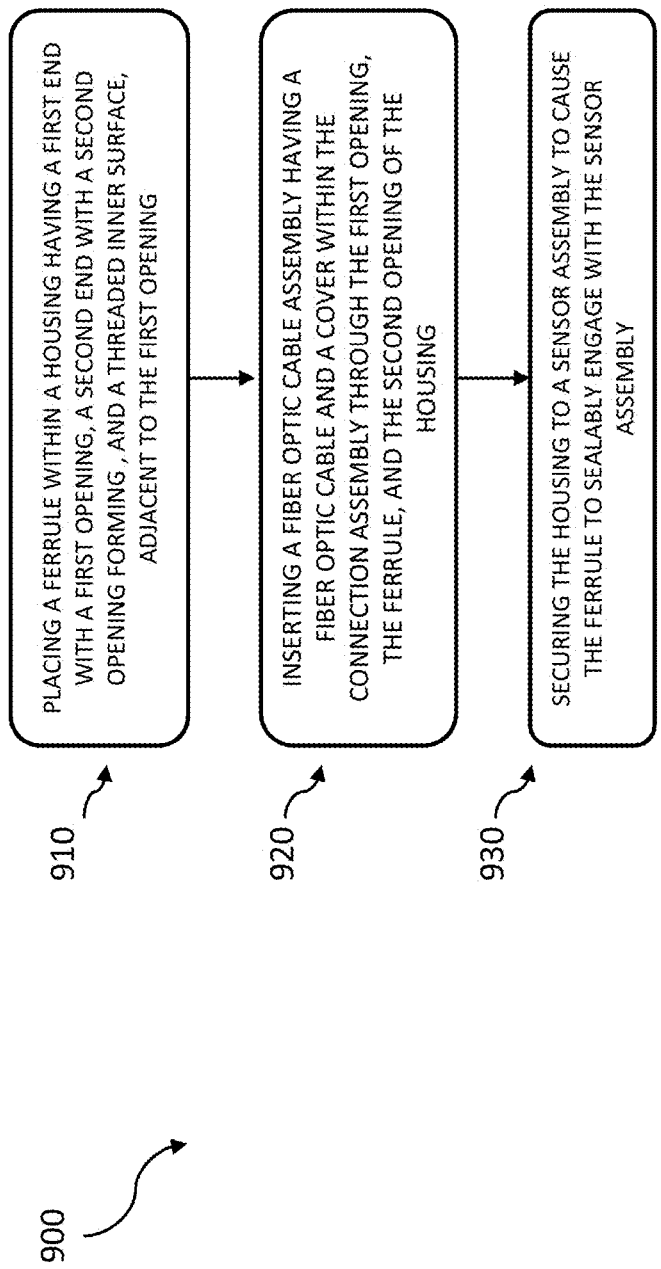
FIG. 9 is a process diagram illustrating an example process of assembling and securing a connection assembly to a sensor assembly as described herein in relation to the embodiment of FIG. 5.

FIG. 9 is a process diagram illustrating an example process 900 of assembling and securing a connection assembly to a sensor assembly as described herein in relation to FIG. 5. At 910, a connection assembly 230 can be assembled. Assembling the connection assembly 230 can include placing a ferrule 220 within a housing 210 adjacent to the first opening 2120.

At 920, the process 900 can include inserting a fiber optic cable assembly 260 within the connection assembly 230. The fiber optic cable assembly 260 can be inserted through the second opening 2140, the ferrule 220.

At 930, the process 900 can include securing the housing 210 to a sensor assembly 270. The securing can cause the ferrule 220 to sealably engage the sensor assembly 270, penetrating the cover 250 of the fiber optic cable 240. Securing the housing 210 to the sensor assembly 270 can form a hermetic seal between the fiber optic cable assembly 260 and the sensor assembly 270.

In some embodiments, the method 900 can also include a step of coupling the sensor assembly 270 to a piece of industrial equipment 405 to acquire data of an operation of the industrial equipment. In some embodiments, the industrial equipment can include a combustion chamber of a turbine, mechanical inspection devices, medical devices, communication devices, lighting devices, and/or broadcasting devices. In some embodiments, the securing can also include mating a second inner surface 218 of the housing 210 with an outer surface 272 of the sensor assembly 270. Although, coupling of the housing 210 and the sensor assembly 270 is shown using a threaded coupling, non-threaded coupling mechanisms can also be envisioned without limit.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, can be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "approximately" includes within 1, 2, 3, or 4 standard deviations. In certain embodiments, the term "about" or "approximately" means within 50%, 20%, 15%, %, 9%, 8%, 7%, 6%, 5%, 4%, 3%, 2%, 1%, 0.5%, or 0.05% of a given value or range. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A connection assembly configured to hermetically couple a fiber optic cable having a cover directly abutting a circumference of the fiber optic cable to a sensor assembly, the connection assembly comprising:
a housing including a first end having a first opening configured to receive the fiber optic cable during a connection operation and a second end having a second opening, larger than the first opening, and configured to receive the sensor assembly during the connection operation, wherein an inner surface of the housing proximate to the second opening is provided with female threads configured to secure to the housing to the sensor assembly; and
at least one ferrule positioned within the housing adjacent to the first opening and having a third opening extending therethrough and configured to receive the fiber optic cable during the connection operation,
wherein, as the housing is secured to the sensor assembly, the at least one ferrule is configured to penetrate the cover of the fiber optic cable to provide a hermetic connection between the sensor assembly and the fiber optic cable.

2. The connection assembly of claim 1, wherein the at least one ferrule includes a first ferrule and a second ferrule, wherein
the first ferrule is positioned within the housing adjacent to the first opening, the first ferrule including a first sloped portion and a protruding portion adjacent to the first sloped portion, the second ferrule is positioned between the first ferrule and the second opening, the second ferrule including a second sloped portion and a wedge-shaped portion, further wherein
the first sloped portion of the first ferrule is configured to engage with the second sloped portion of the second ferrule, and the wedge-shaped portion of the second ferrule is configured to engage with the sensor assembly as the housing is secured to the sensor assembly.

3. The connection assembly of claim 2, wherein at least one of the first sloped portion of the first ferrule and the wedge-shaped portion of the second ferrule are configured to penetrate the cover as the housing is secured to the sensor assembly.

4. The connection assembly of claim 1, wherein the housing and the at least one ferrule are made from stainless steel.

5. The connection assembly of claim 1, wherein the housing and the at least one ferrule are configured for use in a sensing environment having an operating temperature between −55 degrees and 325 degrees Celsius.

6. The connection assembly of claim 1, wherein the at least one ferrule, the fiber optic cable, and the sensor assembly are arranged with respect to one another along a longitudinal axis extending through the housing from the first opening to the second opening.

7. The connection assembly of claim 1, wherein the housing is configured to releasably engage with the sensor assembly to allow for repeatable sealing and unsealing.

8. The connection assembly of claim 1, wherein the sensor assembly includes a flame sensor.

9. The connection assembly of claim 1, wherein the at least one ferrule is chosen from a set of a self-swaging nut, an integrated taper adapter, an insulated ferrule, an uninsulated ferrule, a twin ferrule, and an olive ferrule.

10. The connection assembly of claim 1, further comprising:
the cover, wherein the cover is configured to be provided around an exterior of the fiber optic cable prior to the connection operation, wherein the cover further includes at least one notch configured to receive the at least one ferrule as the housing is secured to the sensor assembly.

11. A connection assembly configured to hermetically couple a fiber optic cable having a cover directly abutting a circumference of the fiber optic cable to a sensor assembly, the connection assembly comprising:
a housing having an opening extending therethrough, wherein an inner surface of the opening is provided with threads configured to secure the housing to corresponding threads provided on the sensor assembly; and
at least one ferrule positioned within the opening of the housing, wherein the opening of the housing and the at least one ferrule are configured to receive the fiber optic cable therethrough during a connection operation, and wherein the at least one ferrule is configured to penetrate the cover of the fiber optic cable to provide a hermetic connection between the sensor assembly and the fiber optic cable as the housing is secured to the sensor assembly.

12. A connection assembly configured to hermetically couple a fiber optic cable having a cover directly abutting a circumference of the fiber optic cable to a sensor assembly, the connection assembly comprising:
a housing having an opening extending therethrough, wherein an inner surface of the opening is provided with threads configured to secure the housing to corresponding threads provided on the sensor assembly; and
at least one ferrule positioned within the opening of the housing, wherein the fiber optic cable is configured to be received within the opening of the housing and the at least one ferrule during a connection operation, and wherein an interaction between the sensor assembly and the at least one ferrule as the housing is secured to the sensor assembly is configured to cause the at least one ferrule to penetrate the cover of the fiber optic cable to provide a hermetic connection between the sensor assembly and the fiber optic cable.

* * * * *